US010069814B2

(12) United States Patent
Kaladgi et al.

(10) Patent No.: US 10,069,814 B2
(45) Date of Patent: Sep. 4, 2018

(54) SINGLE SIGN ON ACROSS MULTIPLE DEVICES USING A UNIQUE MACHINE IDENTIFICATION

(71) Applicant: CA, Inc., New York, NY (US)

(72) Inventors: Jameel Ahmed Kaladgi, Bangalore (IN); Mohammed Mujeeb Kaladgi, Bangalore (IN)

(73) Assignee: CA, Inc., New York, NY (US)

( * ) Notice: Subject to any disclaimer, the term of this patent is extended or adjusted under 35 U.S.C. 154(b) by 304 days.

(21) Appl. No.: 14/526,127

(22) Filed: Oct. 28, 2014

(65) Prior Publication Data
US 2016/0119324 A1 Apr. 28, 2016

(51) Int. Cl.
*G06F 7/04* (2006.01)
*G06F 15/16* (2006.01)
*G06F 17/30* (2006.01)
*H04L 29/06* (2006.01)
*G06F 21/41* (2013.01)

(52) U.S. Cl.
CPC .......... *H04L 63/0815* (2013.01); *G06F 21/41* (2013.01)

(58) Field of Classification Search
CPC .......... G06F 21/41; G06F 21/31; G06F 21/44; G06F 21/73; H04L 63/0815; H04L 63/0876
See application file for complete search history.

(56) References Cited

U.S. PATENT DOCUMENTS

| 6,748,420 B1* | 6/2004 | Quatrano | G06F 17/30873 707/E17.111 |
| 8,281,381 B2 | 10/2012 | Kranendonk et al. | |
| 8,800,007 B1* | 8/2014 | Rajagopalan | H04L 63/0272 380/27 |
| 2005/0091539 A1* | 4/2005 | Wang | G06F 21/31 726/4 |
| 2006/0168264 A1* | 7/2006 | Baba | H04L 12/2809 709/230 |
| 2009/0300744 A1* | 12/2009 | Guo | H04L 63/0823 726/7 |
| 2011/0030044 A1* | 2/2011 | Kranendonk | H04L 63/0815 726/8 |
| 2013/0318249 A1* | 11/2013 | McDonough | H04L 67/02 709/228 |

(Continued)

FOREIGN PATENT DOCUMENTS

WO WO2011/056533 A1 5/2011

*Primary Examiner* — Trong Nguyen
(74) *Attorney, Agent, or Firm* — Vierra Magen Marcus LLP

(57) ABSTRACT

Single sign on technology enables shared access to a protected service, such as an application, from a plurality of dynamically associated computing devices. After logging into the application from one of the computing device, a user may access the application from the other computing devices without re-authentication. A user may also log out from the application from any of the computing device. Unique machine identifications, such as device DNA, for identifying each of the computing devices are used in, for example, a method, apparatus (such as a login server) and computer program product. A single session may be shared across multiple computing devices. The same authentication token, such as a SAML token, may also be used for all of the computing devices having the same user session.

20 Claims, 9 Drawing Sheets

(56) References Cited

U.S. PATENT DOCUMENTS

2014/0189841 A1* 7/2014 Metke .................... G06F 21/40
                                                    726/9
2015/0237049 A1* 8/2015 Grajek ............... H04L 63/0815
                                                    726/7

* cited by examiner

| User Identifications | Machine Identifications |
|---|---|
| User1 | AHJBHF15286GY |
| User1 | 9TwZz37rsAHxp |
| User1 | EGn3ARTtDO5x1 |
| User2 | 77P3SRb8Lqz4E5 |
| User3 | K8ru36kYwQ0e4 |
| User3 | 33Yl7j59Gm4oi |

Database
102a

*FIG. 3*

Hash (Device DNA) = Machine ID

Hash(cpuspeed=1201; fonts={ arial, verdana, Arabic}, hadd-capacity=123456; os-version=8; processor-family=intel;

keyboard-delay=12.55; max-resolution-Y=1024)= AHJBHF15286GY=++

Table I

*FIG. 4*

SINGLE SIGN ON ACROSS MULTIPLE DEVICES USING A UNIQUE MACHINE IDENTIFICATION

BACKGROUND

The present disclosure relates to communicating between computing devices, and in particular accessing a protected service, such as an application, from multiple computing devices.

Users generally use multiple computing devices like desktop, laptop, tablet, mobile phones etc. to use the same application. At times, a user may uses these computing devices simultaneously or in tandem. Typically, the user may be expected to login into the application from each computing device separately. When a user chooses to log out from an application they may have to perform the log out action in each computing device separately.

For example, a user may use three computing devices in a typical bring your own device (BYOD) system. An application server may have to maintain triple the number of sessions in the system when one computing device may be typically used at a time. Since the sessions are separate, a user typically may not save temporary work in the session and switch to another computing device.

BRIEF SUMMARY

According to an aspect of the disclosure, a method to access an application comprises outputting, by a first computing device, a request to access the application by the first computing device. The first computing device also receives a request for information used to determine a first machine identification associated with the first computing device and a user identification. The first computing device outputs the information used to determine the first machine identification and the user identification. The first computing device receives an authentication token to access the application. The authentication token is used by a second computing device to access the application. The first computing device receives a session identification to access the application. The session identification identifies a session used by the second computing device to access the application. The first computing device accesses the application using the authentication token and session identification.

According to another aspect of the disclosure, an apparatus comprises a processor and a computer readable storage medium to store computer readable program code. The processor executes the computer readable program code to: 1) receive a first information used to determine a first machine identification of a first computing device and a user identification; 2) calculate the first machine identification of the first computing device in response to the first information; 3) store the first machine identification of the first computing device and the associated user identification; 4) receive a second information used to determine a second machine identification of a second computing device and the user identification; 5) calculate the second machine identification of the second computing device in response to the second information; 6) store the second machine and the associated user identification; 7) output a first authentication token and a first session identification to the first computing device so that the first computing device accesses an application; and 8) output the first authentication token and first session identification to the second computing device so that the second computing device accesses the application.

According to another aspect of the disclosure, a computer program product comprises a computer readable storage medium having computer readable program code embodied therewith. The computer readable program code comprises: 1) computer readable program code configured to receive information used to determine a machine identification associated with a computing device and an associated user identification; 2) computer readable program code configured to calculate the machine identification associated with the computing device in response to the information used to determine the machine identification associated with the computing device; 3) computer readable program code configured to store and retrieve the machine identification and the associated user identification; 4) computer readable program code configured to provide an authentication token to the computing device to accesses an application as well as provide the same authentication token to another computing device to access the application; and 5) computer readable program code configured to provide a session identifier to the computing device and provide the same session identifier to the another computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

FIG. 3 illustrates information including user identifications and associated machine identifications stored in a database according to an embodiment.

FIG. 4 illustrates a table I including exemplary computer readable program code to obtain a machine identification in an embodiment.

DETAILED DESCRIPTION

Figure 1:
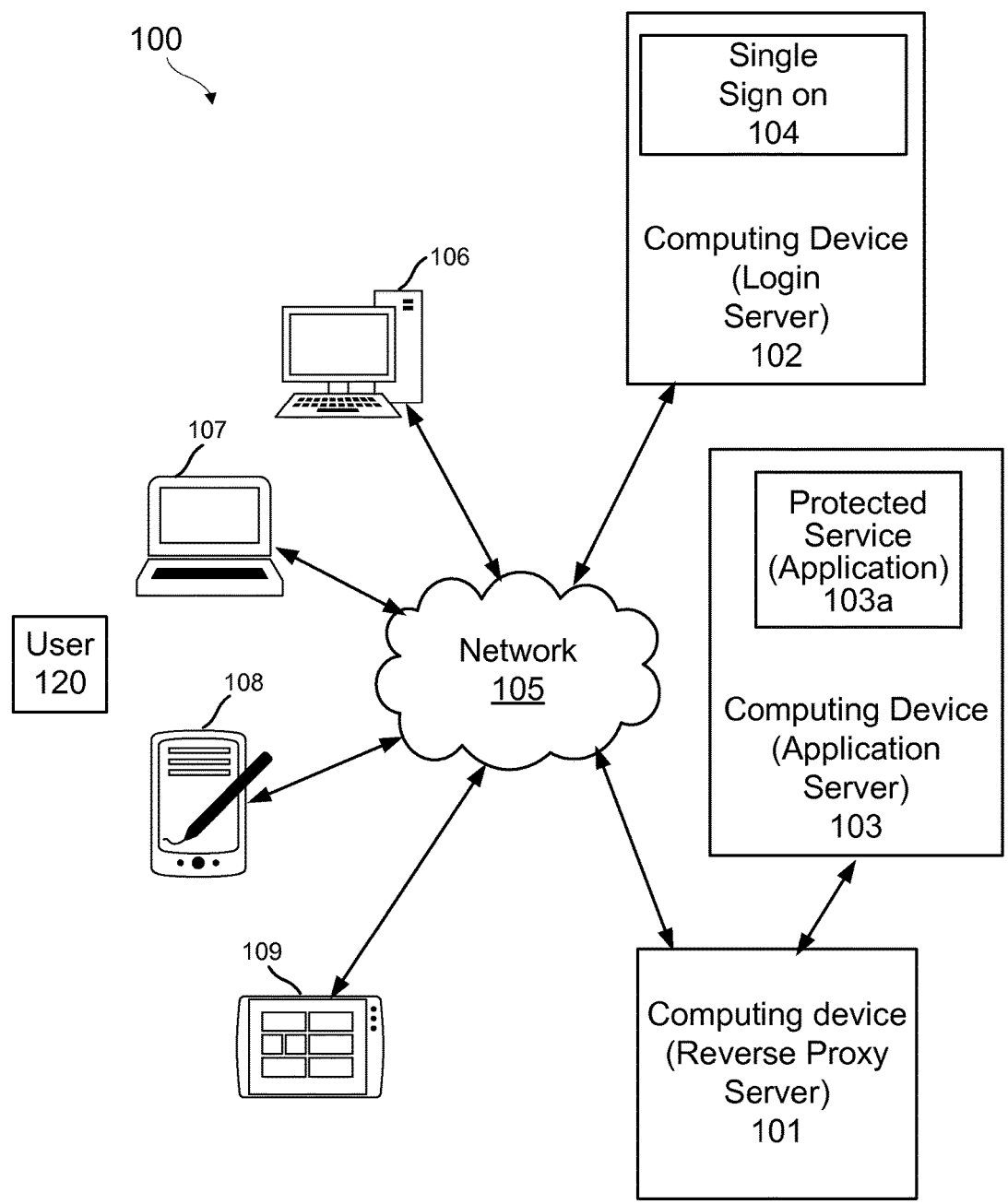
FIG. 1 illustrates a high-level block diagram of an apparatus or system comprising computing devices using a single sign on method according to an embodiment.

Single sign on technology described herein enables shared access to a protected service or resource, such as an application, from a plurality of dynamically associated computing devices. After logging into the application from one of the computing device, a user may access the application from the other computing devices without re-authentication (for example, providing a username and password). A user may also log out from the application from any of the computing device. Unique machine identifications, such as device DNA, for identifying each of the computing devices are used in, for example, a method, apparatus (such as a login server) and computer program product. A single session may be shared across multiple computing devices. The same authentication token, such as a security assertion markup language token (SAML) token, may also be used for all of the computing devices having the same user session.

In embodiments, single sign on technology across multiple dynamically associated computing devices may increase user convenience, reduce the number of session used and/or increase security. For example, a user may sign on to an application on one computing device and then switch between computing devices in accessing the application in the single shared session. Similarly, a user may logout from any of the computing devices that may further enhance convenience and security. Since a single shared session across multiple session may be used, a server may not have to create separate sessions of each computing device. A single session identifier (or id, identification) may be generated and provided to the multiple computing devices used by (or belonging to) the same user. In an embodiment, security may be increased by reducing a threat of session based attacks. A device profile used to identify a computing device, that may include device type, Internet Protocol (IP) address and/or host name, may be spoofed while unique machine identifications identify a particular computing device associated with a user (or user identifier, user identification or user name) may not.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated signal with computer readable program code embodied therein, for example, in baseband or as part of a carrier wave.

Propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, Radio Frequency (RF), etc., or any suitable combination of the foregoing.

Computer (readable) program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer (or computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations, sequence diagrams and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Similarly, each arrow of a sequence diagram may likewise be implemented by computer program instructions. These computer program instructions may be provided to a processor of a general purpose computer (or computing device), special purpose computer, or other programmable data processing apparatus to produce a machine, such that the instructions, which execute via the processor of the computer or other programmable instruction execution apparatus, create a mechanism for implementing the functions/acts specified in the flowchart, sequence diagram and/or block diagram block or blocks.

These computer program instructions may also be stored in a computer readable storage medium that when executed can direct a computer, other programmable data processing apparatus, or other devices to function in a particular manner, such that the instructions when stored in the computer readable storage medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

FIG. 1 is a high-level block diagram of an apparatus (or system) 100 comprising networked computing devices. In an embodiment, a system 100 includes a plurality of computing devices 106-109 of user 120 that are dynamically associated with user 120 so that each computing device 106-109 may share access with a protected service 103a, such as an application, with a single sign on of any of the computing devices. In embodiments, computing device 106 is a desktop computing device, computing device 107 is a laptop computing device, computing device 108 is a cellular telephone or smartphone and computing device 108 is a tablet computing device. In other embodiments, more or fewer types of computing devices may be used.

As illustrated in FIG. 1, user 120 may use multiple computing devices, such as a desktop, netbook, laptop, tablet, personal digital assistant and/or mobile telephones to use or access the same application. At times, user 120 may uses two or more computing devices 106-109 simultaneously or in tandem. Without the single sign on technology described herein, a user 120 may be expected to login (or provide login information, such as username (or user identification) and a password, security code (key), and/or answer to security question) to the application from each computing device 106-109 separately. A user requirement to prove their identity repeatedly may cause inconvenience. A process of re-authentication of each of the computing devices 106-109 used by user 120 may be redundant.

When a user 120 chooses to log out from an application, user 120 may have to perform the log out action in each of computing devices 106-109 separately. This redundant logout (or logoff) action also may add to inconvenience of user 120. User 120 may forget to logout from the application from one of the computing devices leaving a session active and open for attacks.

The number of inactive sessions on a particular application may also increase by the number of computing devices used by user 120. For example, when a user logins to an application from three separate computing devices, an application server (or other server) may have to maintain triple the number of sessions when one may be used at a time by user 120.

Furthermore, since the sessions are separate, user 120 may not be able to save temporary work in the session and switch to another computing device.

In embodiments, single sign on technology across multiple dynamically associated computing devices may increase user convenience, reduce the number of session used and/or increase security. In an embodiment, single sign on technology includes at least one or more computing devices illustrated in FIG. 1 and one or more software components (or computer readable program code) illustrated in FIG. 2.

FIG. 1 is a high-level block diagram of an apparatus (or system) 100 comprising a plurality of dynamically associated computing devices, where each computing device 106-109 may have shared access to a protected service 103a, such as an application. After logging into the application from one of the computing devices 106-109, a user 120 may access the application from one of the other computing devices without re-authentication (for example, providing a username and password). A user 120 may also log out from the application from any of the computing devices 106-109. Unique machine identifications (a.k.a. device DNA, machine identity and/or machine signature in embodiments) for identifying each of the computing devices 106-109 are calculated or generated for each of the computing devices 106-109 in embodiments. Information to determine a unique machine identification (such as session information or machine information) may be output from each of the computing devices 106-109 in response to a request. A single session may be shared across multiple computing devices 106-109 by providing each computing device the same session details or session identification. The same authentication token, such as a security assertion markup language token (SAML) token, may also be used or output to all of the computing devices 106-109 having the same user session.

In an embodiment, single sign on 104 is computer readable program code executed by computing device 102 that at least partially provides single sign on technology described herein. In an embodiment, computing device 102 is embodied as a login server that, at least, provides requests for information to determine machine identifications, calculate and store machine identifications and associated user identifications, provide authentication tokens and provide session identifiers to one or more of computing devices 106-109. In an embodiment, computing device 102 performs an authentication function of a computing device attempting to access protected service 103a. In an embodiment, computing device 102 requests login information, such as user identification and a password, from a computing device attempting to access protected service 103a for the first time. Computing device 102 compares received login information to stored login information before providing an authentication token to the computing device attempting access. In an embodiment, re-authentication is not performed for other computing devices used by user 120 that attempt to access the same protected service 103a. Computing device 102 also stores and retrieves relational information including machine identifications and associated user identifications as well as a session and authentication information for respective computing devices.

In an embodiment, computing device 101 is embodied as a reverse proxy server to receive requests from computing devices 106-109 to access or login to a protected service 103a of computing device 103. In an embodiment, computing device 101 forwards such requests to computing device 102. In an embodiment, computing device 101 allows access (in a gatekeeper or gateway manner) to computing device 103 in response to the proper authentication token and/or session identification. In an alternate embodiment, computing device is coupled directly to network 105.

In an embodiment, protected service 103a is an application including computer readable program code that when executed by computing device 103 provides a service and/or information to one or more of computing devices 106-109 in response to a request. In an embodiment, computing device 103 is embodied as an application server. In an embodiment, a separate computing device 101 is not used.

In embodiments, computing devices 106-109 may include computer readable program code as described herein to, at least partially, allow single sign on technology across multiple computing devices as described herein. For example, each of the computing devices 106-109 may have computer readable program code to output information to determine respective machine identifications and user identifications as well as receive and store authentication tokens and session identifiers to access protected service 103a. In embodiments, computing devices 106-109 may include a desktop computer, laptop computer, cellular smartphone and/or tablet. In other embodiments, computing devices may include wearable computers, embedded system, mainframe and/or other computing devices having processors executing or reading computer readable programmable code. In embodiment, one or more computing devices illustrated in FIG. 1 include one or more processors to read and/or execute computer readable program code stored on a computer readable storage medium.

In embodiments, computing devices illustrated in FIG. 1 have user interfaces to access the respective computing devices. In embodiments, a user interface includes computer readable program code as well as hardware components. A user interface may include input devices such as a touchscreen, microphone, camera, keyboard, mouse, pointing device and/or position sensors. Similarly, a user interface may include output devices, such as a display, vibrator and/or speaker, to output images, characters, vibrations, speech and/or video as an output. A user interface may also include a natural user interface where a user 120 may speak, touch or gesture to a user interface to provide input.

In embodiments, system 100 includes many more or less computing devices. In an embodiment, computing devices 101 and 102 are combined into a single computing device. In another embodiment, computing devices 101, 102 and 103 are combined into a single computing device. In embodiments, functions described herein are distributed to other or more computing devices.

In embodiments, one or more computing device illustrated in FIG. 1 may act as a server while one or more computing devices may act as a client. In an embodiment, one or more computing devices may act as peers in a peer-to-peer (P2P) relationship.

Computing devices illustrated in FIG. 1 communicate or transfer information by way of network 105. In an embodiment, network 105 may be the Internet, a WAN or a LAN, singly or in combination. In an embodiment, computing devices illustrated in FIG. 1 use one or more protocols to transfer information, such as Transmission Control Protocol/Internet Protocol (TCP/IP). In embodiments, computing devices illustrated in FIG. 1 include input/output (I/O) computer readable program code as well as hardware components, such as I/O circuits to receive and output information from and to other computing devices, via network 105. In an embodiment, an I/O circuit may include a transmitter and receiver circuit.

Figure 2:
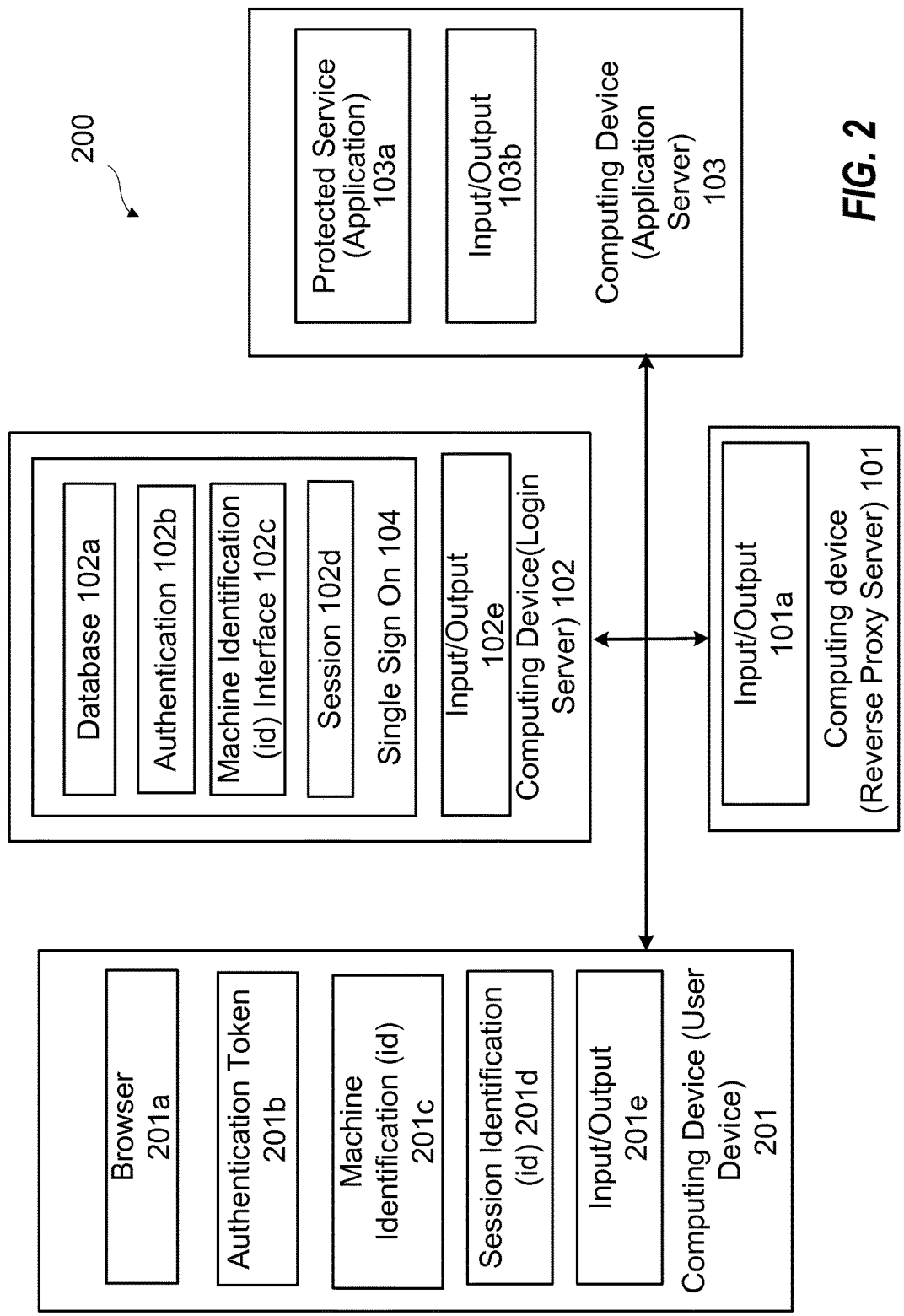
FIG. 2 illustrates a software architecture for the apparatus shown in FIG. 1 according to an embodiment.

FIG. 2 illustrates a software architecture 200 for system 100 shown in FIG. 1 according to embodiments. In an embodiment, computing device 201 is embodied as a user device and may correspond to one or more computing devices 106-109 shown in FIG. 1. Software architecture 200 illustrates computer readable program code or instructions (or portions thereof) to provide a single sign on technology described herein. In embodiments, one or more processors execute (or read) computer (or processor) readable code to provide at least portions of a single sign on technology that allows shared access to a protected service 103a from multiple dynamically associated computing devices of a user.

In embodiments, computer readable program code illustrated in FIG. 2 may be embodied as a software program, software object, software function, software subroutine, software method, software instance, script and/or a code fragment, singly or in combination. In order to clearly describe the technology, computer readable program code shown in FIG. 2 is described as individual software components or components. In embodiments, the software components illustrated in FIG. 2, singly or in combination, may be stored (in computer readable storage medium(s)) and/or executed by a single or distributed computing device (processor) architecture. As one of ordinary skill in the art would understand, the functions performed by the various software components described herein are exemplary. In other embodiments, software components identified herein may perform more or less functions.

In embodiments, computing device 201 includes, one or more of, a browser 201a, authentication token 201b, machine identification (id) 201c, session identification (id) 201d and input/output 201e software components.

Browser 201a is responsible for accessing and/or retrieving information or a service in an embodiment. In an embodiment, browser 201a accesses protected service 103a after obtaining at least an authentication token and session identification (id). In an embodiment, browser 201a is computer readable program code with a graphical user interface for displaying Hyper Text Markup Language (HTML) files, used to navigate an Internet or intranet.

Authentication token 201b, in an embodiment, is responsible for interfacing with a computing device performing an authentication function, such as computing device 102. In an embodiment, authentication token 201b requests, receives and stores an authentication token, such as a SAML token, in order to access a protected service 103a. In an embodiment, authentication token 201b provides login information in response to a request.

Machine identification 201c, in an embodiment, is responsible for providing information used to determine a unique machine identification (id) associated with a particular computing device, such as computing device 201. In an embodiment, machine identification 201c provides information used to determine a unique identification in response to a request. In an embodiment, information used to determine an machine identification may include session information or machine information. Machine information may include, for example, machine attributes such as "cpu speed," "address capacity" "operating system version," "processor family" "keyboard delay" and/or "maximum resolution." Session information may include how long a particular computer readable program code may take to execute on or the number of times the computer readable program code completes an iteration in a particular period of time.

Technology (or portions thereof) to determine machine identifications (or machine identities or machine signatures) is used in embodiments herein as described in World Intellectual Property Organization (WIPO) International Patent Application having International Publication Number WO 2011/056533 and International Application Number PCT/US2010/054023 entitled "Method and System for Machine Identification," with an International Publication date of May 12, 2011 ("WO 2011/056533").

Session identification (id) 201d, in an embodiment, is responsible for obtaining, storing and/or using session details or a session identification (id or identifier) in accessing a protected service 103a.

Input/output 201e, in an embodiment, is responsible for outputting and receiving information, such as requests, authentication tokens and session ids, to and from other networked computing devices, such as computing devices 101-103. In embodiments, other computing devices 101-103 has similar have similar input/output 101a, 102e and 103b. For example, input/output 102e may output a request for information used to determine machine identification, authentication tokens and session ids. For example, input/output 101a may forward requests from computing devices 106-109 to access protected service 103a to computing device 102. Similarly, input/output 103b may output requested information and/or a service in response to a request from computing devices 106-109.

In embodiments, computing device 102 includes, one or more of, database 102a, authentication 102b, machine identification (id) interface 102c, session 102d and input/output 102e software components. In an embodiment, database 102a, authentication 102b, machine identification (id) interface 102c, session 102d are included in single sign on 104.

Database 102a, in an embodiment, is responsible for storing and retrieving unique machine identifications of computing devices used by a user and associated user identifications as illustrated in FIG. 3. In an embodiment, database 102a includes a structure set of relation information 300 having user identifications. The information 300 may be stored prior to use of computing devices 106-109 or stored after receiving the information from the respective computing devices. For example, database 102a stores user identifications 301 and associated machine identifications 302 for respective users. As illustrated in FIG. 3, a user identified as "User1" in user identifications 301 uses three computing devices identified in machine identifications 302 as: "AHJBHF15286GY," "9TwZz37rsAHxp" and "EGn3ARTtDO5x1." Similarly, a user identified as "User2" uses one computing devices having a unique machine identification as "77P3SRb8Lqz4E5;" and a user identified as "User3" uses two computing devices having unique machine identifications of "K8ru36kYwQ0e4" and "33Y17j59Gm4oi."

Authentication 102b is responsible for performing authentication of a computing device in an embodiment. In an embodiment, authentication 102b queries a computing device for login information. In an embodiment, authentication 102b outputs authentication tokens, such as SAML tokens, in response to a comparison of received login information and stored login information. Authentication 102b may also keep track of which computing device used by user 120 is accessing protected service 103a and provide a same or duplicate authentication token to another computer device of user 120 requesting concurrent access to protected service 103a.

Machine identification interface 102c may request information used to determine a machine identification from a computing device 106-109 and store a calculated machine identification in database 102a. In an embodiment, a request may be output at power-on or initialization of a computing device or when a particular computing device requests a protected service.

In an embodiment, a method for calculating a machine identification is illustrated in FIG. 4. Table I of FIG. 4 illustrates exemplary computer readable program code 400 that calculates a unique machine identification using a "Hash (Device DNA)=Machine ID" function. In an embodiment, computing device 102 executes computer readable program code 400 with the identified variables to calculate a unique machine identification. In an embodiment, illustrated variables are received from the particular computing device as information used to determine a particular machine identification. In this exemplary embodiment, a machine identification (Machine ID) of "AHJBHF15286GY" is calculated for this particular computing device based upon the particular input variables, such as "cpuspeed=1201, etc.) As one of ordinary skill in the art would appreciate, different computer readable program code with different input variables may be used to obtain a unique machine identification. As one of ordinary skill in the art would appreciate, other methods, hardware and computer readable program code, single or in combination thereof, may calculate or provide a unique machine identification.

In alternate embodiments, machine identification interface 102c may include software components such as fingerprint code, machine identity database, machine identity comparator and/or machine identity generator as described in WO 2011/056533.

Session 102d is responsible for keeping (storing) track of session details or session ids used by computing devices of user 120 in accessing protected service 103a. Similarly, session 102d is responsible for creating a new session when a computing device of user 120 is not accessing protected service 103a. Session 102d provides the same session details or id to a computing device of a user 120 that attempts to access protected service 103a when another computing of user 120 is accessing protected service 103a.

Figure 5A:
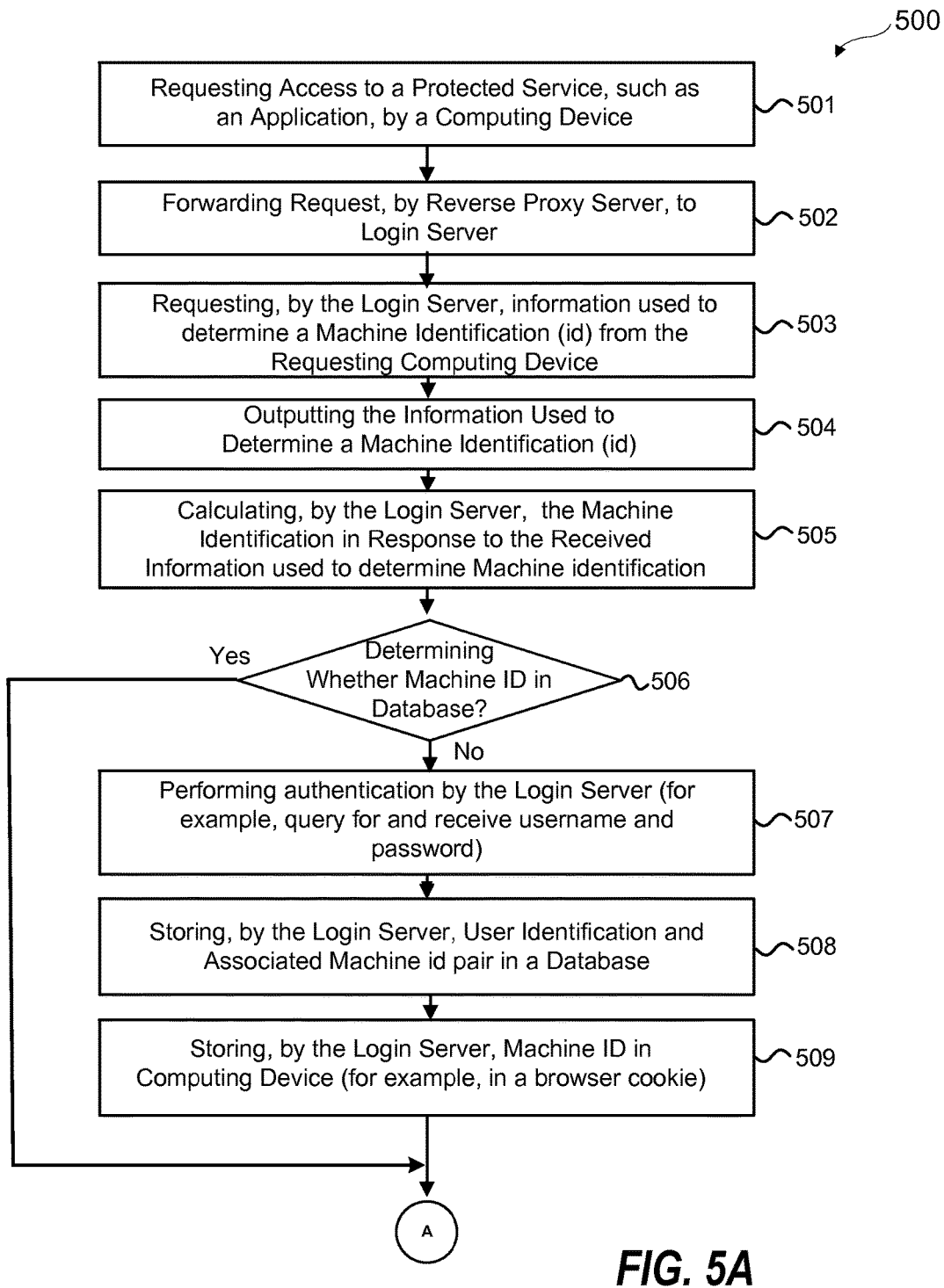
FIGS. 5A-B and 6-8 illustrate flowcharts of single sign on methods according to an embodiments.
Figure 5B:
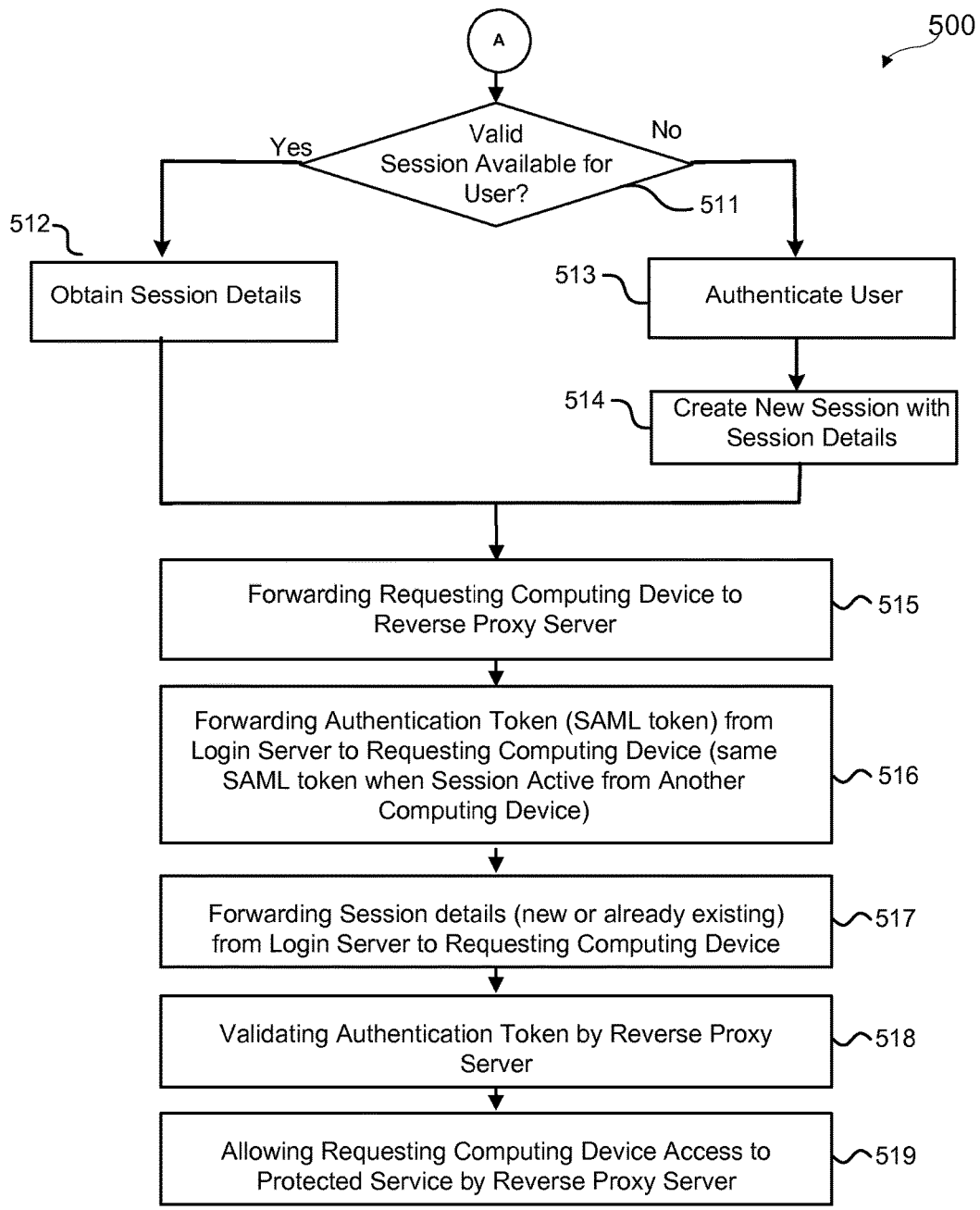

FIGS. 5A-B illustrate a flowchart of a single sign on method 500 according to an embodiment. In an embodiment, one or more computing devices 106-109 and 101-103 shown in FIG. 1 execute computer readable program code (or processor readable instructions), such as one or more software components shown in FIG. 2, to perform at least portions of method 500. In an embodiment, method 500 is performed, at least partially, by single sign on 104 executed by computing device 102.

Logic block 501 represents requesting access to a protected service, such as an application, by a computing device. In an embodiment, one of computing devices 106-109 outputs a request to access protected service 103a to computing device 101 via network 105.

Logic block 502 represents forwarding the request, by a reverse proxy server, to a login server. In an embodiment, computing device 101 forwards the request to computing device 102 via network 105. In an embodiment, input/output 101a executed by computing device 101 performs this function.

Logic block 503 represents requesting, by the login server, information used to determine a machine identification (id) from the requesting computing device. In an embodiment, machine identification interface 102c executed by computing device 102 performs this function.

Logic block 504 represents outputting the information used to determine a machine identification (id). In an embodiment, machine identification 201c executed by the requesting computing device performs this function.

Logic block 505 represents calculating, by the login server, the machine identification in response to the information used to determine a machine identification (id). In an embodiment, machine identification interface 102c executed by the requesting computing device performs this function.

Logic block 506 represents determining whether a machine identification is stored in a database, such as database 102a. In an embodiment, database 102 executed by computing device 102 performs this function. When the machine identification is stored in the database, control transitions to logic block 511. Otherwise, control transitions to logic block 507.

Logic block 507 represents performing authentication by the login server. In an embodiment, authentication 102b executed by computing device 102b performs this function. For example, authentication 102b queries the requesting computing device for login information, such as a user identification (user name) and password.

Logic block 508 represents storing, by the Login Server, user identification and associated machine identification pair in a database, such as database 102a. In an embodiment, database 102a executed by computing device 102 performs this function.

Logic block 509 represents storing, by the login server, machine identification in requesting computing device. In an embodiment, machine identification 102c executed by computing device 102 performs this function, such as storing the machine identification as a browser cookie in browser 201a.

Logic block 511 represents determining whether a valid session is available for the associated user. In an embodiment, session 102d performs this function. When a user has a current session with a request application, control transitions to logic block 512 where session details or a current session id is obtained and control passes to logic block 515.

Otherwise, control transitions to logic block 513 and 514 where a user is authenticated and a new session is created. In an embodiment, authentication 102b and session 102d perform these functions, respectively. Control then passes to logic block 515.

Logic block 515 represents forwarding requesting computing device to reverse proxy server, such as computing device 101. In an embodiment, input/output 102e executed by computing device 102 performs this function.

Logic block 516 represents forwarding an authentication token, such as a SAML token, from a login server to a requesting computing device. In an embodiment, the same or duplicate SAML token used in another active session of another computing device of a user is forwarded. In an embodiment, authentication 102b and input/output 102e executed by computing device 102 performs this function to forward the authentication token to computing device 101.

Logic block 517 represents forwarding session details or a session identification (new or already existing) from a login server to the requesting computing device. In an embodiment, session 102d and input/output 102e executed by computing device 102 performs this function. In an embodiment, computing device 101 embodied as a reverse proxy server receives the above identified authentication token and session id (new or existing).

Logic block 518 represents validating authentication token by reverse proxy server. In an embodiment, input/output 101a executed by computing device 101 performs this function.

Logic block 519 represents allowing requesting computing device access to protected service, such as protected service 103a, by a reverse proxy server, such as computing device 101. In an embodiment, input/output 101a executed by computing device 101 performs this function.

Figure 6:
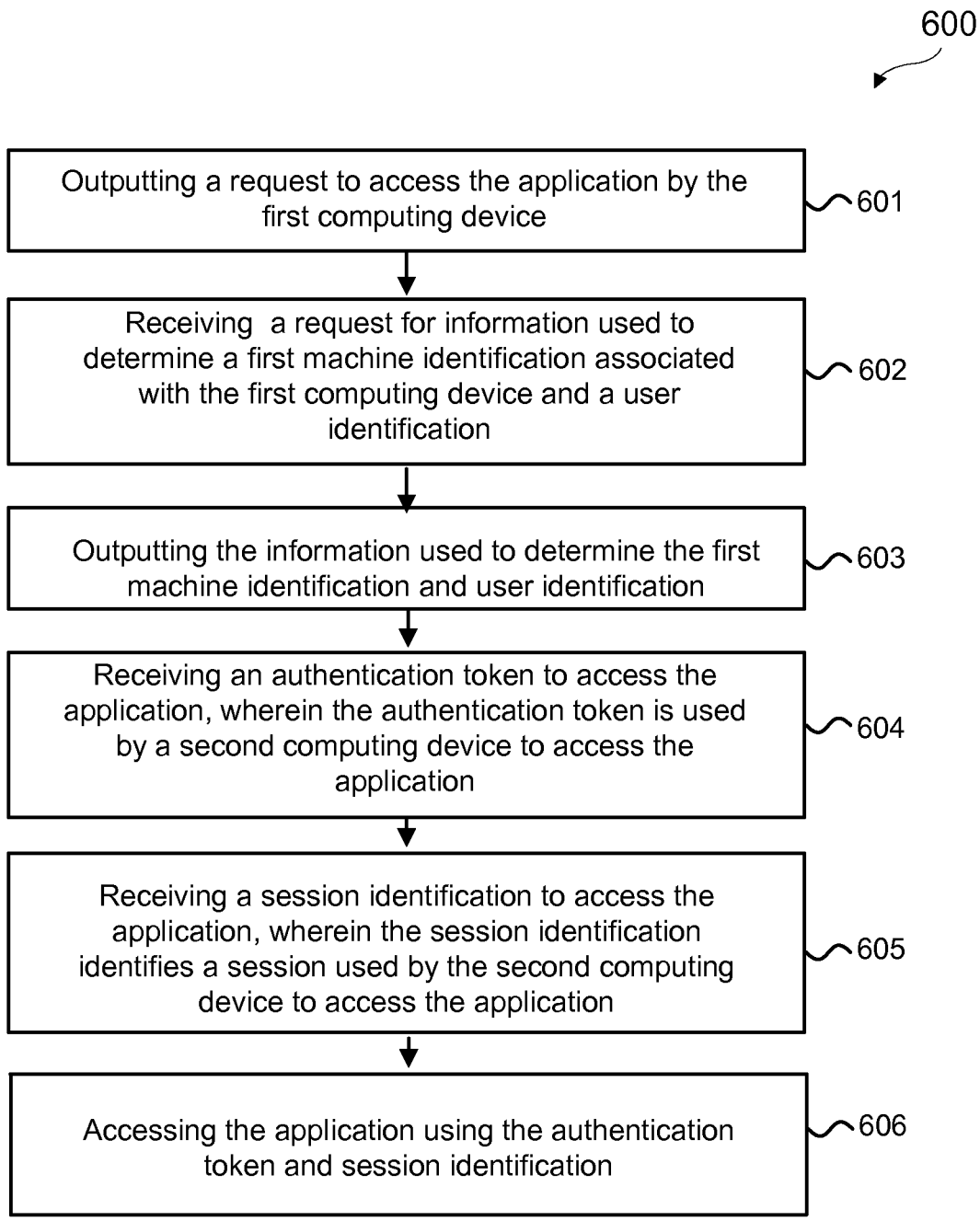

FIG. 6 is a flowchart illustrating a single sign on method 600 according to an embodiment. In an embodiment, one or more computing devices 106-109 and 101-103 shown in FIG. 1 execute computer readable program code (or processor readable instructions) to perform at least portions of method 600. In an embodiment, computing device 201 executing at least some of the software components shown in FIG. 2 perform at least a portion of method 600.

Logic block 601 illustrates outputting a request to access an application by a first computing device. In an embodiment as illustrated in FIG. 1, computing device 106 outputs a request to computing device 101 embodied as a reverse proxy server in order to access a protected service 103a, such as an application, from computing device 103 embodied as an application server. In an embodiment, input/output 201e and/or browser 201a of computing device 106 performs this function.

Logic block 602 illustrates receiving a request for information used to determine a first machine identification associated with the first computing device and a user identification. In an embodiment, computing device 106 receives this request from computing device 102 embodied as a login server. In an embodiment, input/output 201e, machine identification 201c and/or browser 201a of computing device 106 performs this function.

Logic block 603 illustrates outputting the information used to determine the first machine identification and the user identification. In an embodiment, input/output 201e and machine identification 201c of computing device 106 performs this function. In an embodiment, the information used to determine the first machine identification may include session information and/or machine information. In an embodiment, a machine identification 201c in computing device 102 calculates the machine identification that uniquely identifies a computing device in response to the information used to determine the first machine identification from computing device 106. In an embodiment, exemplary machine identifications that are calculated and user identifications may be stored as illustrated in FIG. 3.

Logic block 604 illustrates receiving an authentication token to access the application, wherein the authentication token is used by a second computing device to access the application. In an embodiment, computing device 107 is concurrently accessing protected service 103a using the same authentication token that is provided to computing device 106. In an embodiment, authentication token 201b and input/output 201e executed by computing device 106 perform this function.

Logic block 605 illustrates receiving a session identification to access the application, wherein the session identification identifies a session used by the second computing device to access the application. In an embodiment, computing device 107 is concurrently accessing protected service 103a using the same session that is provided to computing device 106. In an embodiment, session 102d and input/output 201e executed by computing device 106 perform this function.

Logic block 606 illustrates accessing the application using the authentication token and session identification. In an embodiment, computing device 106 accesses or uses protected service 103a embodied as an application using the same authentication token and session identification that is used by computing device 107 that is concurrently accessing protected service 103a. The same session (session id or session details) used to access the protected service 103a by computing device 107 is used by computing device 106.

Figure 7:
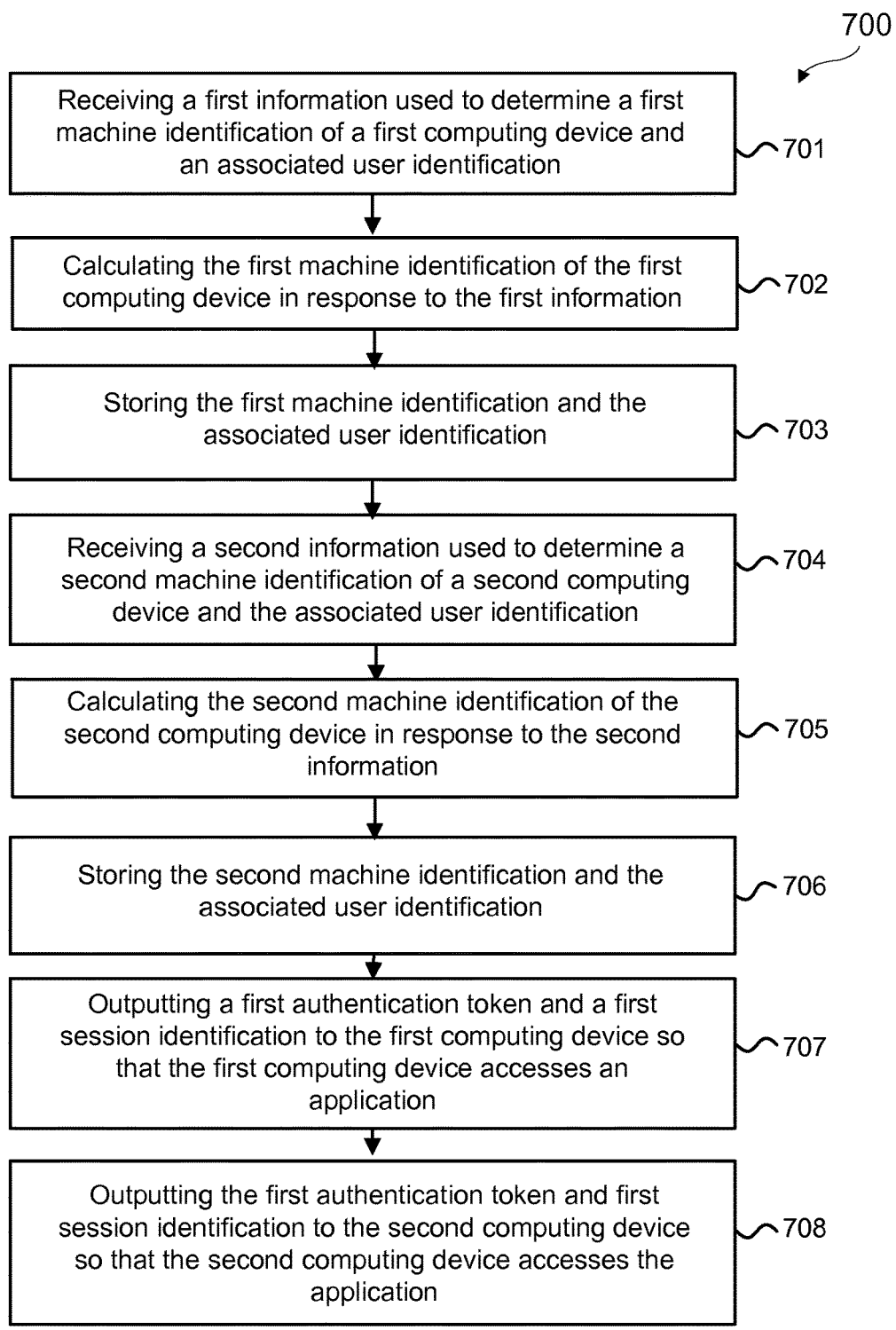

FIG. 7 is a flowchart illustrating a single sign on method 700 according to an embodiment. In an embodiment, one or more computing devices 101-103 shown in FIG. 1 execute computer readable program code (or processor readable instructions) to perform at least portions of method 700.

Logic block 701 illustrates receiving a first information used to determine a first machine identification of a first computing device and an associated user identification. In an embodiment, computing device 102 receives the first information and associated user identification from one or more computing devices 106-109 shown in FIG. 1. In an embodiment, input/output 102e executed by processing device 102 performs this function.

Logic block 702 illustrates calculating the first machine identification of the first computing device in response to the first information. In an embodiment, machine identification interface 102c executed by processing device 102 performs this function. In an embodiment, a machine fingerprint code or computer readable program code is executed by computing device 102 as described in WO 2011/056533.

Logic block 703 illustrates storing the first machine identification of the first computing device and the associated user identification. In embodiment, computing device 102 executing computer readable program code, such as software components shown in computer device 102 in FIG. 2, performs at least a portion of this function. In an embodiment, database 102a performs this function. For example, a user identification "User1" having a machine identification "AHJBHF15286GY" may be stored in database 102a as illustrated in FIG. 3. In an embodiment, machine identification "AHJBHF15286GY" is calculated and then stored with an associated user identification "User1" in computing device 102.

Logic block 704 illustrates receiving a second information used to determine a second machine identification associated with a second computing device and the associated user identification. In an embodiment, computing device 102 receives a second machine identification and associated user identification from one or more computing devices 106-109 shown in FIG. 1. In an embodiment, input/output 102e performs this function.

Logic block 705 illustrates calculating the second machine identification of the second computing device in response to the second information. In an embodiment, machine identification interface 102c executed by processing device 102 performs this function. In an embodiment, a machine fingerprint code or computer readable program code is executed by computing device 102 as described in WO 2011/056533.

Logic block 706 illustrates storing the second machine identification and the associated user identification. In embodiment, computing device 102 executing computer readable program code, such as software components shown in computer device 102 in FIG. 2, performs at least a portion of this function. In embodiment, computing device 102 executing computer readable program code, such as software components shown in computer device 102 in FIG. 2, performs at least a portion of this function. In an embodiment, database 102a performs this function.

Logic block 707 illustrates outputting a first authentication token and a first session identification to the first computing device so that the first computing device accesses an application. In an embodiment, a first authentication token, such as a SAML token, is output from computing device 102 to computing device 106 that allows computing device 106 access to a protected service 103a, or application, provided by computing device 103. In an embodiment, a session identification or identifier is also output from computing device 102 to computing device 106 that allows computing device access to a protected service, such as an application, provided by computing device 103.

Logic block 708 illustrates outputting the first authentication token and first session identification to the second computing device so that the second computing device accesses the application. In an embodiment, the first authentication token (the same authentication token output to computing device 106 in logic block 707) is output from computing device 102 to computing device 107 that allows computing device 107 (while computing device 106 may also access the same session) shared access to a protected service 103a, or application, provided by computing device 103. In an embodiment, a session identification or identifier (the same session identifier output to computing device 106 in logic block 707) is also output from computing device 102 to computing device 107 that allows computing device access to a protected service, such as an application, provided by computing device 103.

Figure 8:
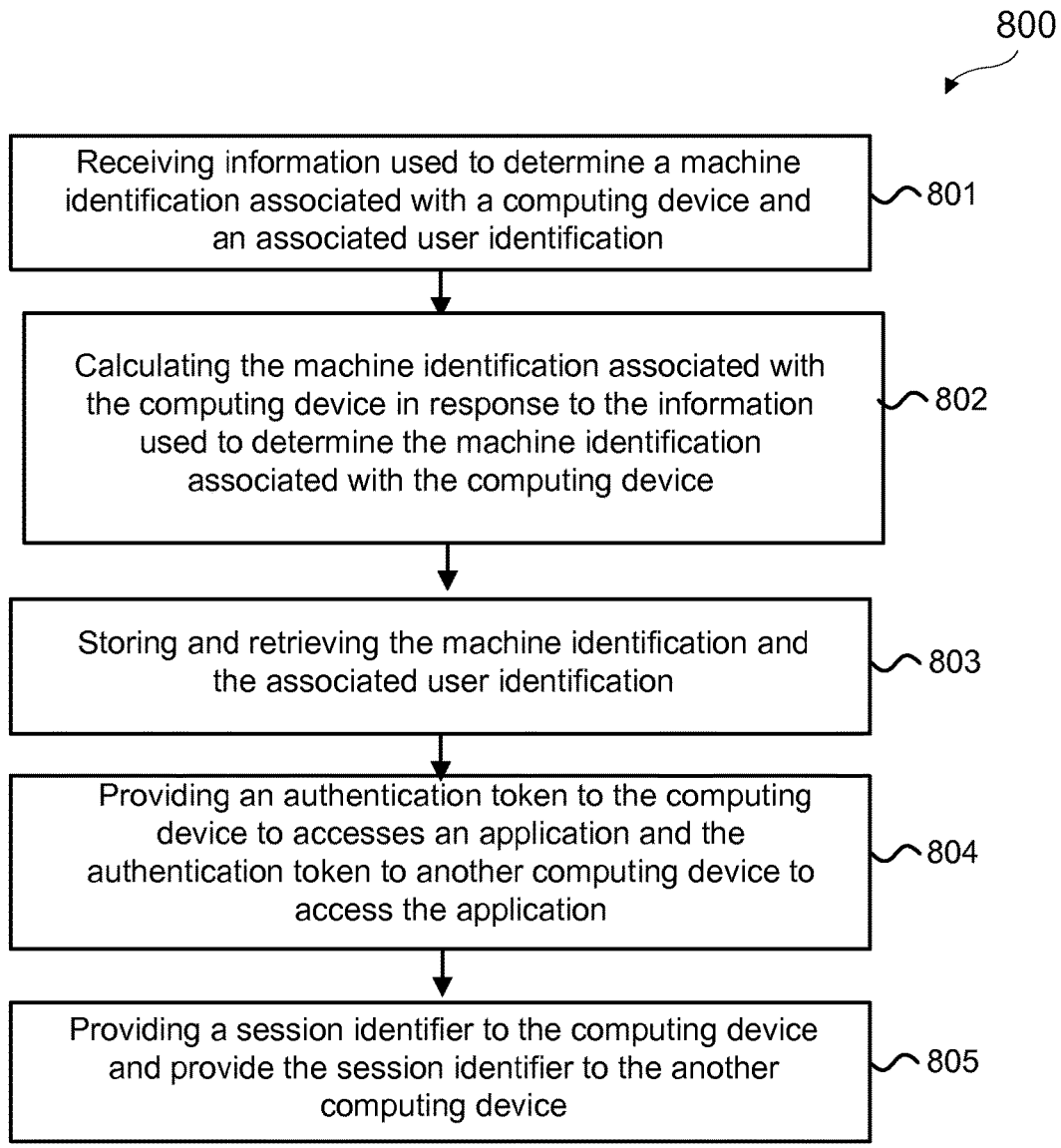

FIG. 8 is a flowchart illustrating a single sign on method 800 according to an embodiment. In an embodiment, one or more computing devices 101 and 102 shown in FIG. 1 execute computer readable program code (or processor readable instructions) to perform at least portions of method 800.

Logic block 801 illustrates receiving information used to determine a machine identification associated with a computing device and an associated user identification. In an embodiment, computing device 102 receives information used to determine a machine identification and an associated user identification from one or more computing devices 106-109 shown in FIG. 1.

Logic block 802 illustrates calculating the machine identification associated with the computing device in response to the information used to determine the machine identification associated with the computing device. In an embodiment, machine identification interface 102c executed by processing device 102 performs this function. In an embodiment, a machine fingerprint code or computer readable program code is executed by computing device 102 as described in WO 2011/056533. In an alternate embodiment a "Hash (Device DNA)=Machine ID' function illustrated in Table I of FIG. 4 is used.

Logic block 803 illustrates storing and retrieving the machine identification and the associated user identification. In embodiment, computing device 102 executing computer readable program code, such as software components shown in computer device 102 in FIG. 2, performs at least a portion of this function.

Logic block 804 illustrates providing an authentication token to the computing device to accesses an application and the authentication token to another computing device to access the application. In embodiment, computing device 102 executing computer readable program code performs at least a portion of this function. In an embodiment, the authentication token is provided to at least two of computing devices 106-109.

Logic block 805 illustrates providing a session identifier to the computing device and provide the session identifier to another computing device. In an embodiment, the session identifier or identification is provided to at least two of computing devices 106-109.

Figure 9:
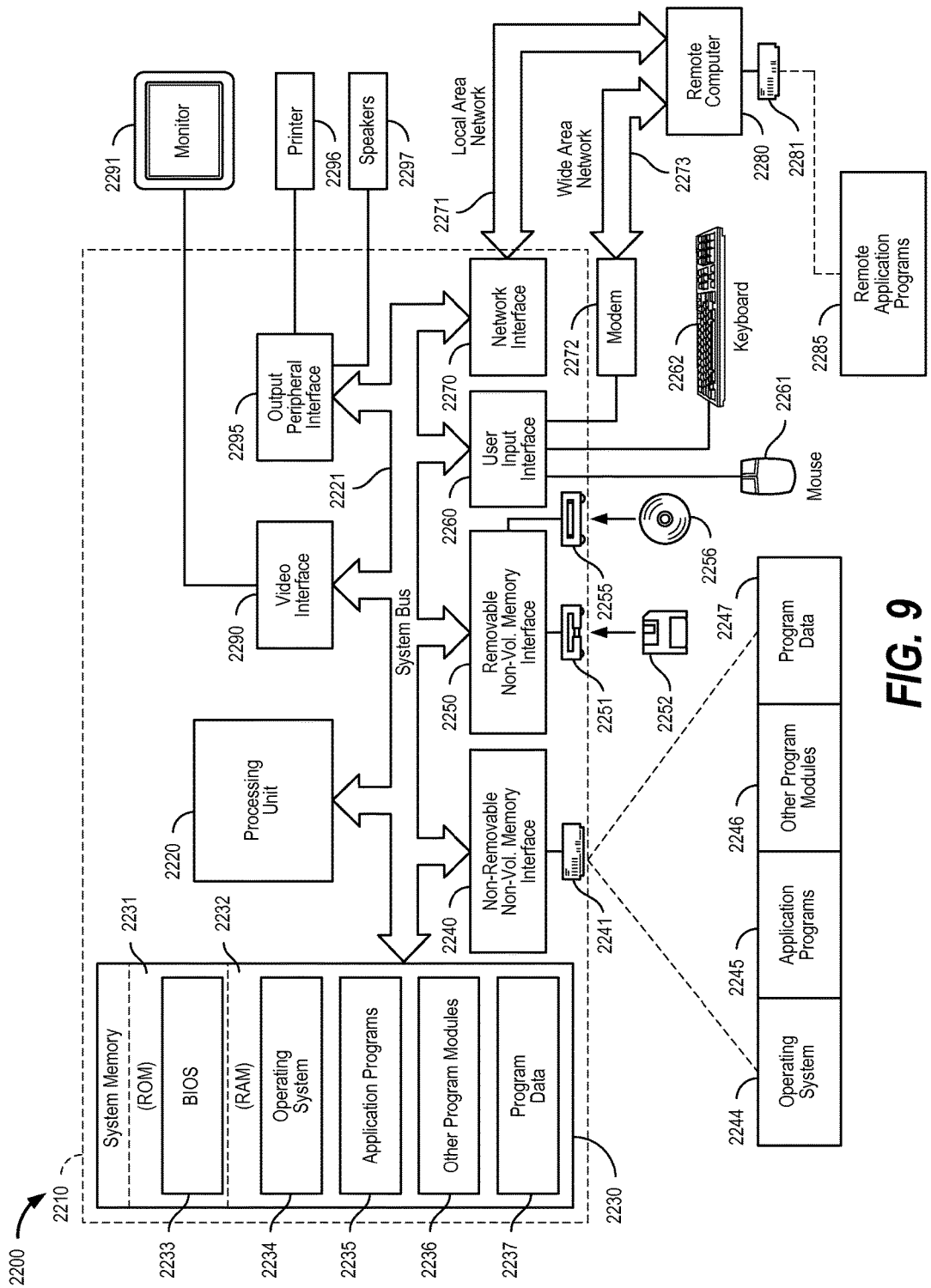
FIG. 9 is a block diagram of a computing device environment according to an embodiment.

The disclosed technology may be used with various computing systems or computing devices. FIG. 9 is a block diagram of an embodiment of a system environment 2200. Computing system environment 2200 includes a general purpose computing device in the form of a computer 2210. In embodiments, computing devices 106-109 as wells as computing devices 101-103 shown in FIG. 1 may include one or more components of computer 2210. In embodiments, computing devices 108 and 109 may be a cellular telephone and tablet, respectively, with similar mobile components. In embodiments, computing devices 101 and 103 may include one or more servers having one or more components in computer 2210.

Components of computer 2210 may include, but are not limited to, a processing unit (or core (s)) 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media or processor readable memory. Computer readable media can be any available media that can be accessed by computer 2210 and includes both volatile and nonvolatile media, removable and non-removable media. By way of example, and not limitation, computer readable media may comprise computer readable storage media. Computer readable storage media includes both volatile and nonvolatile, removable and non-removable media implemented in any method or technology for storage of information such as computer readable instructions, data structures, program modules or other data. Computer readable storage media includes, but is not limited to, random access memory (RAM), read only memory (ROM), electrically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer readable storage media in the form of volatile and/or nonvolatile memory such as ROM 2231 and RAM 2232. A basic input/output system (BIOS) 2233, containing the basic routines that help to transfer information between elements within computer 2210, such as during start-up, is typically stored in ROM 2231. RAM 2232 typically contains data and/or program modules that are immediately accessible to and/or presently being operated on by processing unit 2220. The system memory 2230 may store operating system 2234, application program(s) 2235, other program module(s) 2236, and program data 2237. In an embodiment, computer program code as described herein may be at least partially stored in application program(s) 2235. In an embodiment, protected service 103a shown in FIG. 1 corresponds to application program(s) 2235. In an embodiment, database 102a shown in FIG. 1 corresponds to application(s) 2235 to store and retrieve user identifications and machine identifications, as described herein, as program data 2237.

The computer 2210 may also include other removable/non-removable, volatile/nonvolatile computer readable storage media. The computer 2210 may include a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through a non-removable memory interface such as interface 2240, and magnetic disk drive 2251 and optical disk drive 2255 are typically connected to the system bus 2221 by a removable memory interface, such as interface 2250.

The drives and their associated computer readable storage media described above provide storage of computer (processor) readable instructions, data structures, program modules and other data for the computer 2210. Hard disk drive 2241 is illustrated as storing operating system 2244, application program(s) 2245, other program module(s) 2246, and program data 2247. Note that these components can either be the same as or different from operating system 2234, application program(s) 2235, other program module(s) 2236, and program data 2237. Operating system 2244, application program(s) 2245, other program module(s) 2246, and program data 2247 are given different numbers here to illustrate that, at a minimum, they are different copies.

A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. In embodiments, computer 2210 includes input/output software and hardware to output and receive information from other computers on a network. For example, FIG. 9 illustrates a remote computer 2280 that may be a personal computer, a server, a router, a network PC, a peer device or other common network node, and typically includes many or all of the elements described above relative to the computer 2210. In an embodiment, one or more computing devices 101-103 and 106-109 shown in FIG. 1 correspond to remote computer 2280. In an embodiment, input/output software or program modules to transfer information on a network may be stored in network interface 2270 and/or modem 2272. In embodiments, other input/output software may be stored and executed in other components of computer 2210. The logical connections may include a LAN 2271 and a WAN 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. For example, remote application program(s) 2285 may reside on memory device 2281. It will be appreciated that the network connections shown are exemplary and other means of establishing a communications link between the computers may be used.

The flowchart, sequence diagrams and block diagrams in the Figures illustrate the architecture, functionality, and operation of possible implementations of systems, methods and computer program products according to various aspects of the present disclosure. In this regard, each block in the flowchart or block diagram (or arrow in sequence diagram) may represent a module, segment, or portion of code, which comprises one or more executable instructions for implementing the specified logical function(s). It should also be noted that, in some alternative implementations, the functions noted in the block may occur out of the order noted in the figures. For example, two blocks (or arrows) shown in succession may, in fact, be executed substantially concurrently, or the blocks (or arrows) may sometimes be executed in the reverse order, depending upon the functionality involved. It will also be noted that each block of the block diagrams or arrows and/or flowchart illustration, and combinations of blocks in the block diagrams or arrows and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method to access by way of two or more computing devices, a same session of an application, the method comprising:
    first outputting, by a first computing device, a first request to access a protected application currently being protectively executed by an application server, the first computing device being coupled by way of a network to the application server, the protected application requiring at least one log-in and the protected application being capable of supporting plural sessions, each of the plural sessions is capable of having respective temporary work;
    first receiving, by the first computing device and after said first outputting, a request for information used to determine a first machine identification associated with the first computing device and a user identification;
    second outputting, by the first computing device, the information used to determine the first machine identification and the user identification;
    second receiving, by the first computing device and after said second outputting, an authentication token to access the protected application that is currently being protectively executed by the application server, wherein the authentication token is also used by a second computing device to access a specific session of the protected application that is currently being protectively executed by the application server, the second computing device being coupled by way of the network to the application server;
    third receiving, by the first computing device and after said second outputting, a session identification operable to access the specific session of the protected application that is currently being protectively executed by the application server; and
    accessing, by the first computing device and by way of the network, the specific session of the protected application that is currently being protectively executed by the application server using the received authentication token and the received session identification, said accessing by the first computing device occurring via the network and by way of the application server requiring submission via the network of a proper session identifier from each computing device requesting to access the specific session of the protected application that is protectively executed by the application server, wherein during said accessing by the first computing device, the first computing device is capable of accessing unsaved temporary work of the specific session if the unsaved temporary work is present at a time of said accessing of the specific session by the first computing device.

2. The method of claim 1, further comprising:
    outputting, by the second computing device, a request to access the protected application by the second computing device;
    receiving, by the second computing device, a request to provide login information;
    outputting, by the second computing device, the login information; and
    receiving, by the second computing device, the authentication token and the session identification.

3. The method of claim 2,
    wherein the login information comprises the user identification and a password,
    wherein the user identification is a user name, and
    wherein the first computing device does not provide the login information to access the protected application.

4. The method of claim 2, comprising:
    receiving, by the second computing device, a request for information used to determine a second machine identification associated with the second computing device and the user identification; and
    outputting, by the second computing device, the information used to determine the second machine identification associated with the second computing device.

5. The method of claim 4, comprising:
    receiving, by a third computing device and via the network, the information used to determine the first machine identification and the user identification;
    receiving, by the third computing device, the information used to determine the second machine identification and the user identification;
    calculating, by the third computing device, the first machine identification in response to the information used to determine the first machine identification;
    calculating, by third computing device, the second machine identification in response to the information used to determine the second machine identification;
    storing, by the third computing device, the first machine identification and the user identification in computer readable storage medium of the third computing device;

storing, by the third computing device, the second machine identification and the user identification in the computer readable storage medium of the third computing device;

outputting, by the third computing device, the authentication token to the first computing device and the second computing device; and outputting, by the third computing device and via the network, the session identification to the first computing device and the second computing device.

6. The method of claim 5, wherein the information used to determine the first machine identification include machine information of the first computing device, and wherein the third computing device executes computer readable program code in response to the machine information of the first computing device to provide the first machine identification.

7. The method of claim 6, wherein said outputting, by the third computing device, the authentication token to the first computing device comprises determining whether the first machine identification associated with the first computing device is stored in the computer readable storage medium of the third computing device.

8. The method of claim 7, wherein said outputting, by the third computing device, the session identification to the first computing device comprises:
determining, by the third computing device, whether the second computing device is using the session identification to access the specific session of the protected application.

9. The method of claim 8, wherein the third computing device is embodied in a reverse proxy server and a login server, wherein the authentication token is a security assertion markup language token.

10. The method of claim 1 wherein the specific session of the protected application that is currently being protectively executed by the application server is a protected service accessible by way of a reverse proxy server.

11. An apparatus comprising:
a processor operatively coupled to a network; and
a computer readable, hardware storage medium storing computer readable program code, the computer readable program code being configured to cause the processor to receive via the network, first information usable to determine a first machine identification of a first computing device and an associated user identification, to first calculate the first machine identification of the first computing device and determine the associated user identification in response to the first information, to store the first calculated first machine identification and the first determined associated user identification, to receive via the network, second information usable to determine a second machine identification of a second computing device and an associated user identification, to second calculate the second machine identification of the second computing device and determine the associated user identification in response to the second information, to store the second calculated second machine identification and the second determined associated user identification, to output via the network, a first authentication token and a first service-accessing session identification to and usable by the first computing device so that the first computing device is capable of accessing a corresponding session of a protected service that is protectively executed by a corresponding server, the protected service being capable of supporting plural sessions, where each of the supported plural sessions is capable of having respective temporary work; the accessing by the first computing device occurring via the network and by way of the corresponding server requiring submission via the network of a proper session identification from each computing device requesting to access the corresponding session of the protected service that is protectively executed by the corresponding server and to output via the network to the second computing device, the first authentication token and the first service-accessing session identification used by the first computing device to access said corresponding session of the protected service that is protectively executed by the corresponding server so that the second computing device is capable of accessing the corresponding session of the protected service that is already being accessed by the first computing device wherein during said accessing by the second computing device, the second computing device is capable of accessing unsaved temporary work of the corresponding session if the unsaved temporary work is present at a time of said accessing of the corresponding session by the second computing device.

12. The apparatus of claim 11, wherein the processor executes the computer readable program code to:
receive sign on information from the first computing device and not receive another sign on information from the second computing device.

13. The apparatus of claim 12, wherein the sign on information from the first computing device comprises a username and a password.

14. The apparatus of claim 13, wherein the apparatus is embodied in a login server.

15. The apparatus of claim 11, wherein the information used to determine the first machine identification of the first computing device comprises machine information including session information.

16. The apparatus of claim 11, wherein the processor executes the computer readable program code to calculate the first machine identification of the first computing device in response to the first information comprises the processor executes a fingerprint code in response to session information to calculate the first machine identification.

17. A computer program product, comprising:
a non-transitory computer readable storage medium having computer readable program code integrally embodied therewith, the computer readable program code comprising:
program code configured to cause a programmable machine to receive via a network, information usable to determine a machine identification associated with a computing device and an associated user identification;
program code configured to cause a programmable machine to calculate the machine identification associated with the computing device and determine the associated user identification in response to the information usable to determine the machine identification associated with the computing device and the associated user identification;
program code configured to cause a programmable machine to store and retrieve the calculated machine identification and the determined associated user identification;
program code configured to cause a programmable machine to provide an authentication token via the network, to the computing device to allow access by the computing device to a specific session of a protected application that is being protectively executed by a corresponding server and to provide the authentication token via the network, to another computing device to thereby allow access by the other computing device to the specific session of the protected application that is being protectively executed by the corresponding server and that is already being accessed by the computing device; wherein the protected application is capable of supporting plural sessions, each of the plural sessions is capable of having respective temporary work; and program code configured to cause a programmable machine to provide a session identifier to the computing device and to provide the session identifier to the other computing device so that either of the computing device and the other computing device is capable of accessing the specific session of the protected application that is being protectively executed by the corresponding server, said accessing of the specific session by either of the computing device and the other computing device occurring via the network and by way of the corresponding server requiring submission via the network of a proper session identification from each computing device requesting to access the specific session of the protected application that is protectively executed by the corresponding server wherein during said accessing of the specific session either of the computing device and the other computing device is capable of accessing unsaved temporary work of the specific session if the unsaved temporary work is present at a time of said accessing of the specific session by either of the computing device and the other computing device.

18. The computer program product of claim 17, wherein the computer readable program code comprises:

program code to cause a programmable machine to receive login information from the computing device so that said other computer device does not have to provide the login information.

19. The computer program product of claim 17, wherein the machine identification and the associated user identification are stored in a database including a plurality of unique machine identifications and associated user identifications.

20. The computer program product of claim 17, wherein the computer readable storage medium is embodied in a login in server.

* * * * *